(12) United States Patent
Zhu et al.

(10) Patent No.: US 12,345,581 B1
(45) Date of Patent: Jul. 1, 2025

(54) FIXTURE APPLIED TO STICKING STRAIN GAUGE ON HOPKINSON SQUARE BAR AND USE METHOD THEREOF

(71) Applicant: Shenzhen University, Shenzhen (CN)

(72) Inventors: Jianbo Zhu, Shenzhen (CN); Chengcheng Xie, Shenzhen (CN); Tao Zhou, Shenzhen (CN); Heping Xie, Shenzhen (CN); Weiyue Bao, Shenzhen (CN); Zhuo Cen, Shenzhen (CN); Shiwei Zhang, Shenzhen (CN); Junyan Li, Shenzhen (CN); Linsheng Liang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/022,278

(22) Filed: Jan. 15, 2025

(30) Foreign Application Priority Data

Jun. 12, 2024 (CN) .................. 202410748569.X (51) Int. Cl.
*G01N 1/22* (2006.01)
*G01L 1/22* (2006.01)
*G01N 3/06* (2006.01)
*G01N 3/317* (2006.01)

(52) U.S. Cl.
CPC .............. *G01L 1/2206* (2013.01); *G01N 3/06* (2013.01); *G01N 3/317* (2013.01); *G01N 2203/001* (2013.01); *G01N 2203/005* (2013.01); *G01N 2203/0256* (2013.01)

(58) Field of Classification Search
CPC ........ G01L 1/2206; G01N 3/06; G01N 3/317; G01N 2203/001; G01N 2203/005; G01N 2203/0256; G01N 3/02; G01N 3/18; G01N 3/36; G01N 3/08; G01N 3/307; G01N 3/38; G01N 3/12; G01P 21/00
See application file for complete search history.

(56) References Cited

U.S. PATENT DOCUMENTS

| | | | |
|---|---|---|---|
| 2021/0318216 A1 | 10/2021 | Zhu | |
| 2021/0325287 A1* | 10/2021 | Xie | ............ G01N 3/08 |
| 2022/0128442 A1* | 4/2022 | Zhou | ............ G01N 3/317 |

FOREIGN PATENT DOCUMENTS

| | | |
|---|---|---|
| BR | 102013028243 A2 | 3/2016 |
| CN | 108223522 B | 6/2018 |
| CN | 109538590 B | 3/2019 |

OTHER PUBLICATIONS

Shanwei Yang, A review of Hopkinson pressure bar technology based on optical detection methods, Technology Innovation and Application, Issue No. 9, 2018, Aug. 31, 2018 (Aug. 31, 2018), pp. 4-9.

* cited by examiner

*Primary Examiner* — Brandi N Hopkins
(74) *Attorney, Agent, or Firm* — Birchwood IP (57) ABSTRACT

Provided is a fixture applied to sticking a strain gauge on a Hopkinson square bar and a use method of the fixture. The invention is specially designed for a square waveguide bar, and the fixture further ensures consistency of the same group of strain gauges along a cross-section position of the bar. The fixture has important practical value in application in a dynamic true triaxial electromagnetic Hopkinson bar test, especially in a high-end material testing field requiring high-precision and high-reliability test data.

9 Claims, 13 Drawing Sheets

FIXTURE APPLIED TO STICKING STRAIN GAUGE ON HOPKINSON SQUARE BAR AND USE METHOD THEREOF

CROSS-REFERENCE TO RELATED APPLICATIONS

This application claims priority to Chinese Patent Application No. 202410748569.X, filed on Jun. 12, 2024, which is hereby incorporated by reference in its entirety.

TECHNICAL FIELD

The present invention relates to the field of high-end equipment manufacturing, and more particularly, to a fixture applied to quickly sticking a strain gauge on a square waveguide bar and a use method thereof.

BACKGROUND

Research on dynamic mechanical response of rocks under the condition of medium and high strain rates (101$s$-1 to 103$s$-1) is generally carried out by using a split Hopkinson bar. The invention of patent No. US20210318216A1 provides a dynamic true triaxial electromagnetic Hopkinson bar system and a testing method, which can apply synchronous dynamic stress waves to six incident bars synchronously in three axes and six directions, and an arrival error of the six stress waves is guaranteed within 5 Image. True triaxial static load can be applied in three axial directions while the stress waves are applied, so as to realize three-axis and six-direction synchronous dynamic impact under the true triaxial static load. However, this dynamic true triaxial electromagnetic Hopkinson bar testing system is different from a traditional pneumatic Hopkinson bar which employs a round bar piece as a waveguide bar in the testing system. However, in the dynamic true triaxial electromagnetic Hopkinson bar system, a bar piece with a square cross-section is required to be used as a waveguide bar to realize true triaxial loading. In a Hopkinson bar test, a strain gauge is usually used as a main signal monitoring tool to collect stress wave signals in the waveguide bar and calculate a strain of a test sample accordingly. In the traditional pneumatic Hopkinson bar system, because only a single incident bar is involved, only one set of strain gauges is needed to record complete incident stress wave data. In addition, because the system uses a circular waveguide bar, a sticking position of the strain gauge can be accurately calibrated by rotating the bar piece.

In the dynamic true triaxial electromagnetic Hopkinson bar test system, a multiaxial synchronous loading ability of the system increases complexity of the test. The system can trigger stress waves on six square waveguide bars at most at the same time, which requires sticking strain gauges at corresponding positions of each waveguide bar (for example, a middle section of the bar piece) to ensure monitoring synchronization of the stress waves. However, a transverse dispersion effect of the stress waves in the square waveguide bar (the dispersion effect here means that a stress wave amplitude at a center of the bar piece is greater than that at an edge at the same cross-section). Moreover, a horizontal position deviation of the strain gauges on the same bar piece will have a dispersion effect on the measured stress wave data. In addition, due to the use of the square waveguide bar, it is particularly difficult to ensure consistency of horizontal and axial positions of the strain gauges on different bar pieces, so that relative position deviation of the strain gauges may have a significant impact on the test results.

In view of this, it is necessary to design a set of special strain gauge sticking fixture for the dynamic true triaxial electromagnetic Hopkinson bar test system, which is specially suitable for the square waveguide bar. Such a fixture can ensure that sticking positions of the strain gauges on all bar pieces are consistent, thus improving the accuracy and the reliability of the test results.

SUMMARY

In a traditional Hopkinson bar test, it is usually only necessary to stick a strain gauge on a single circular waveguide bar. However, a dynamic true triaxial electromagnetic Hopkinson bar test system involves a problem of synchronous stress wave measurement of multiple square waveguide bars because of multi-axial synchronous loading characteristics of the dynamic true triaxial electromagnetic Hopkinson bar test system. It is difficult to ensure position consistency of strain gauges by using a traditional sticking method. Aiming at this challenge, an innovative set of strain gauge sticking fixture is invented, which is specially designed for square waveguide bars. It not only considers a demand of synchronous loading, but also solves the problem of the position consistency of the strain gauges, and provides a special and accurate strain monitoring solution for the dynamic true triaxial electromagnetic Hopkinson bar test system.

In order to solve the problems in the prior art, the present invention provides a fixture applied to sticking a strain gauge on a Hopkinson square bar, which comprises a laser rangefinder assembly frame, an elastic material layer, a laser rangefinder, a fixture outer frame, an elastic material cushion layer, a strain gauge positioning sticker, a transparent adhesive tape for strain gauge sticking, adhesive tape holes, a clamping buckle and a rotating shaft structure;

the rotating shaft structure is arranged on the fixture outer frame; the elastic material layer is arranged in the laser rangefinder assembly frame, and stable connection between the laser rangefinder and the laser rangefinder assembly frame is realized by a way that the elastic material layer is compressed and interference-assembled; the elastic material cushion layer is arranged in the fixture outer frame; at least one strain gauge positioning sticker is provided, one side of the strain gauge positioning sticker contacted with the elastic material cushion layer is made of adhesive material, and the strain gauge positioning sticker is directly adhered to the elastic material cushion layer through the adhesive material layer; the strain gauge positioning sticker is depicted with a prefabricated strain gauge positioning groove, and a size and a shape of the prefabricated strain gauge positioning groove are consistent with a strain gauge to be pasted; and a number of the adhesive tape holes corresponds to the strain gauge positioning sticker, one strain gauge positioning sticker corresponds to two adhesive tape holes, the adhesive tape holes are used for fixing the transparent adhesive tape for strain gauge sticking, and the transparent adhesive tape for strain gauge sticking is tightly stuck on the strain gauge positioning sticker through the adhesive tape holes.

As a further improvement of the present invention, the fixture outer frame comprises a fixture left outer frame and a fixture right outer frame, and the fixture left outer frame and the fixture right outer frame are connected through a left fixture outer frame rotating shaft and a right fixture outer frame snap ring.

As a further improvement of the present invention, the elastic material cushion layer comprises a left elastic material cushion layer and a right elastic material cushion layer; and an inner side of the fixture left outer frame is connected with the left elastic material cushion layer, and an inner side of the fixture right outer frame is connected with the right elastic material cushion layer.

As a further improvement of the present invention, the laser rangefinder assembly frame and the elastic material layer are bonded by glue.

As a further improvement of the present invention, an inner diameter of the elastic material layer is about 0.1 mm smaller than an outer diameter of the laser rangefinder.

As a further improvement of the present invention, a thickness of the elastic material cushion layer is less than or equal to 0.3 mm.

As a further improvement of the present invention, a size inside the elastic material cushion layer is consistent with a cross-section size of a bar piece.

A use method of a fixture applied to sticking a strain gauge on a Hopkinson square bar, comprises the steps of opening a clamping buckle, and rotating a rotating shaft structure, thus opening a strain gauge sticking fixture;
  in an open state of the strain gauge sticking fixture, clamping the strain gauge sticking fixture on a waveguide bar, for example, when clamping the strain gauge sticking fixture on an X+ direction waveguide bar, keeping an upper edge of an inner side of the strain gauge sticking fixture without being clamped with the clamping buckle, keeping the strain gauge sticking fixture in the open state, turning on the laser rangefinder to measure a distance by taking an X+ direction waveguide bar supporting holder closest to the strain gauge sticking fixture as a reference object, and moving the strain gauge sticking fixture along an X-axis direction until the laser rangefinder displays a specified value;
  pressing an upper side of the strain gauge sticking fixture and opening an outer frame of the strain gauge sticking fixture; and fixing a strain gauge on the transparent adhesive tape for strain gauge sticking; a fixed position of the strain gauge being based on the prefabricated strain gauge positioning groove;
  coating glue evenly on the strain gauges, and after all the strain gauges are coated with glue, closing the clamping buckle;
  applying a pre-tightening force to the strain gauge to squeeze out bubbles at a contact position between the strain gauge and the bar piece, so as to accelerate curing of the strain gauge and the bar piece; and
  after sticking, removing the adhesive tape from an outer side of the adhesive tape hole first after the strain gauge is cured, opening the clamping buckle to remove the strain gauge sticking fixture, and then slowly uncovering the adhesive tape to complete sticking the strain gauge on one bar piece
  wherein, sticking steps of the strain gauges on other bar pieces are the same, and reference objects with axial position parameters along the bar pieces are selected, wherein the axial position parameters along the bar pieces are that before the strain gauge is stuck, an axial position of the strain gauge relative to the bar piece is measured through the laser rangefinder, and the strain gauge sticking fixture is moved to a proper position through the laser rangefinder to ensure that the strain gauges on each bar piece is stuck to the same axial position.

As a further improvement of the present invention, when the laser rangefinder is not installed, the laser rangefinder is first installed on the laser rangefinder assembly frame.

As a further improvement of the present invention, or before the test is started, the strain gauges are stuck.

The present invention has the beneficial effects that:

It is specially designed for the square waveguide bars. Different from the traditional method of sticking strain gauges on the circular waveguide bar, the fixture is specially designed for the square waveguide bars, which solves a positioning problem when sticking strain gauges on the square waveguide bar. The rotating shaft structure is used to connect the left and right outer frames, so that the position of the fixture is not changed after the position is determined by using the laser rangefinder. In the positioning position, the fixture can be opened by rotating the rotating shaft to stick the strain gauges on the fixture, which further ensures the axial position of the fixture compared with the design of assembling the left and right outer frames.

Compared with the way of directly using the laser rangefinder to measure the axial position for sticking the strain gauge, this fixture further ensures the consistency of the cross-sectional positions of the same group of strain gauges along the bar. The fixture can ensure that the positions (comprising horizontal position and axial position) of the strain gauges stuck to all square waveguide bars in a multi-axial synchronous loading system remain strictly consistent, which is very important for the synchronization and waveform consistency measurement.

Accuracy and reliability of the test results are improved. By reducing the data deviation caused by the position errors of the strain gauges, the fixture improves the accuracy of the test data and the reliability of the test results.

These innovative characteristics make the application of the fixture in the dynamic true triaxial electromagnetic Hopkinson bar test have important practical value, especially in the high-end material testing field requiring high-precision and high-reliability test data.

The detail analysis is as follows:

The laser rangefinder 25 is integrated with the fixture outer frame through the laser rangefinder assembly frame 23. The elastic material layer 24 is arranged in the laser rangefinder assembly frame 23, and the size of the elastic material layer 24 is slightly smaller than that of the laser rangefinder. The laser rangefinder 25 is fixed in the laser rangefinder assembly frame 23 by interference fitting to ensure that a relative position of the laser rangefinder with the fixture will not change during use.

The fixture outer frame is entirely made of plastic, which may be divided into two parts: a lower left part and an upper right part. The two parts are connected by the rotating shaft and the clamping buckle. When the clamping buckle is opened, the fixture can be opened by rotating the rotating shaft.

After opening the fixture outer frame, there is a elastic material cushion layer inside the fixture outer frame, the thickness of which is thin, and the internal size of the elastic material cushion layer is just the size of the waveguide bar. An objective of using the elastic material with the size matching with the waveguide bar is that when the clamping buckle is buckled, the elastic material clings to the bar piece exerting a pre-tightening force on the strain gauge, accelerating the glue consolidation, and ensuring good bonding between the strain gauge and the bar piece.

The left and right sides of the elastic material are stuck with one strain gauge positioning sticker, and the shape of the strain gauge is prefabricated on the sticker, which can ensure that the strain gauges on the left and right sides are stuck at the same horizontal position and ensure the accuracy of the measurement results.

The fixture outer frame, the elastic material cushion layer and the strain gauge positioning sticker are all provided with the adhesive tape holes on the upper and lower sides, which are used to fix the strain gauge through the adhesive tape (glue needs to be evenly coated on the strain gauge when sticking the strain gauge, but it needs to ensure that the other side of the strain gauge is complete and good. Usually, one side of the strain gauge with pin is stuck on the adhesive tape, and then glue is evenly coated to the inner side of the strain gauge, and then stuck at a designated position). After the adhesive tape is stuck through the adhesive tape hole (the position of the adhesive tape does not move), the position where the strain gauge needs to be stuck is observed on the strain gauge positioning sticker through the adhesive tape, and the side of the strain gauge with pin is stuck to the corresponding position (there is no order for sticking on the left or right side, and the steps are the same). In this case, the fixture is first placed on the bar, and the clamping buckle is not buckled. After ensuring that the upper side of the elastic material cushion layer is closely attached to the upper edge of the bar, the laser rangefinder at the upper part of the fixture is turned on, and after selecting the reference object (the axial position information of the reference object relative to the bar has been measured before sticking the strain gauge), the fixture is moved in the direction of the bar piece to the preset position. In this case, glue is coated to the inner side of the strain gauge with a toothpick or a small stick. After coating, the clamping buckle is buckled. Because the size of the inner elastic material cushion layer is consistent with the size of the bar piece, they are tightly contacted. The pre-tightening force is applied to the strain gauge to squeeze out the bubbles at the contact position between the strain gauge and the bar piece, so as to accelerate curing of the strain gauge and the bar piece. Meanwhile, because the adhesive tape is stuck to the outer side of the strain gauge, the glue overflowing from the strain gauge can be effectively prevented from adhering the bar piece and the fixture. After sticking, the adhesive tape is removed from the outer side of the adhesive tape hole first after the strain gauge is cured for 10 minutes, the clamping buckle is opened to remove the fixture, and then the adhesive tape is uncovered slowly to complete sticking the strain gauge on one bar piece. The sticking steps of the strain gauges on other bar pieces are the same, and similar reference objects are selected to move the fixture to a proper position through the laser rangefinder to ensure that the strain gauges on each bar piece are stuck to the same axial position.

Names of corresponding components in the drawing are as follows: 1 refers to X+ axial auxiliary slide rail, 2 refers to outer protective frame of X+ direction electromagnetic pulse gun, 3 refers to X+ direction electromagnetic pulse gun supporting base, 4 refers to X+ direction electromagnetic pulse gun, 5 refers to X+ axial supporting platform, 6 refers to X+ direction waveguide bar boss, 7 refers to X+ direction waveguide bar supporting holder, 8 refers to X+ direction waveguide bar, 9 refers to strain gauge sticking fixture, 10 refers to sample, 11 refers to central supporting platform, 12 refers to X-direction waveguide bar, 13 refers to X-direction waveguide bar supporting holder, 14 refers to X-axial auxiliary slide rail, 15 refers to X-axial supporting platform, 16 refers to X-direction waveguide bar boss, 17 refers to outer protective frame of X-direction electromagnetic pulse gun, 18 refers to X-direction electromagnetic pulse gun, 19 refers to X-direction electromagnetic pulse gun supporting base, 20 refers to X-axial hydraulic device, 21 refers to outer protective frame, 22 refers to fixture right outer frame, 23 refers to laser rangefinder assembly frame, 24 refers to elastic material layer, 25 refers to laser rangefinder, 26 refers to rotating shaft structure, 27 refers to left adhesive tape hole, 28 refers to clamping buckle, 29 refers to left elastic material cushion layer, 30 refers to left strain gauge positioning sticker, 31 refers to left transparent adhesive tape for strain gauge sticking, 32 refers to strain gauge, 33 refers to right elastic material cushion layer, 34 refers to right strain gauge positioning sticker, 35 refers to right transparent adhesive tape for strain gauge sticking, 36 refers to right adhesive tape hole, 37 refers to left fixture outer frame rotating shaft, 38 refers to right fixture outer frame snap ring, 39 refers to right fixture outer frame clamping buckle, 40 refers to left fixture outer frame clamping buckle, and 42 refers to prefabricated strain gauge positioning groove.

DESCRIPTION OF EMBODIMENTS

The present invention is further explained with reference to the drawings hereinafter.

Embodiment 1: a fixture applied to sticking a strain gauge a Hopkinson square bar, wherein the fixture mainly consists of a laser rangefinder, a fixture outer frame, an elastic material cushion layer (polymer material, rubber, etc.) and a strain gauge positioning sticker.

Figure 1:
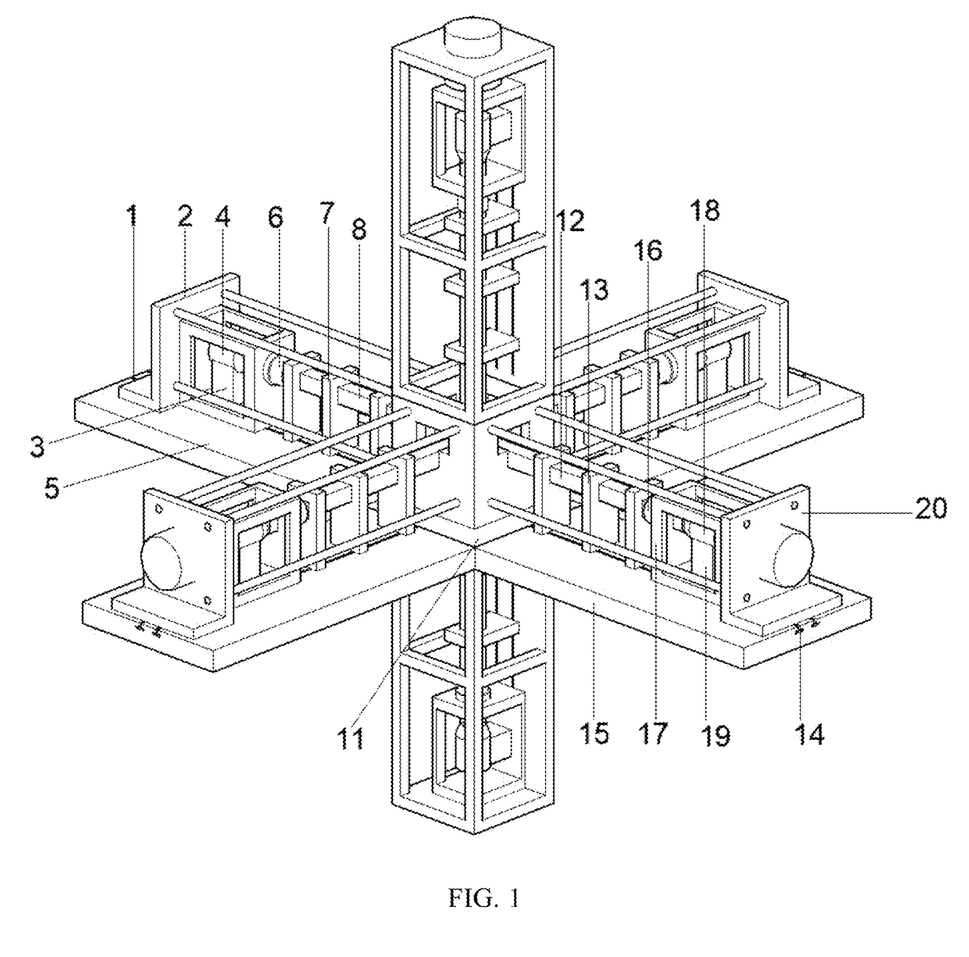
FIG. 1 is a three-dimensional diagram of a dynamic true triaxial electromagnetic Hopkinson bar system in the prior art.
Figure 2A:
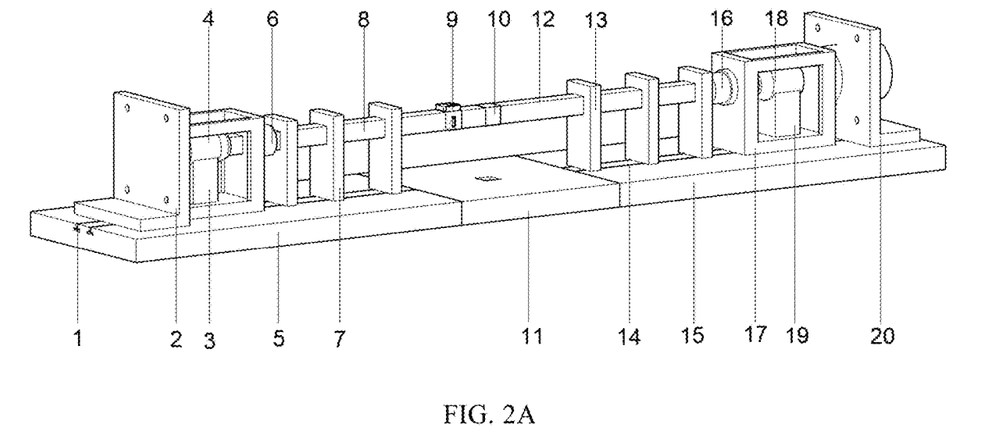
FIG. 2A is a three-dimensional diagram of a dynamic true triaxial electromagnetic Hopkinson bar system additionally provided with a strain gauge sticking fixture (taking an X direction as an example)
Figure 2B:
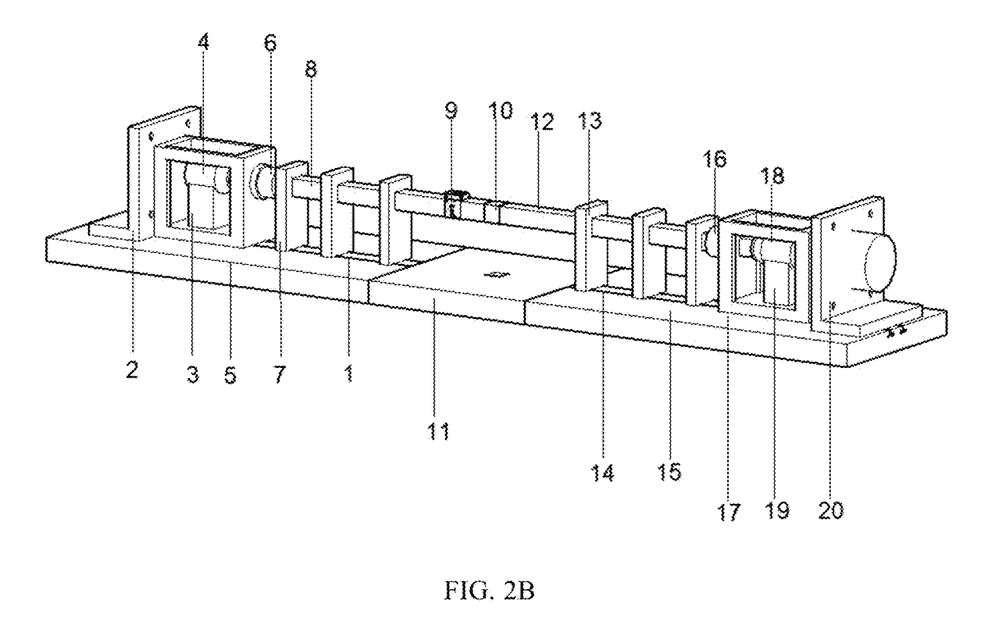
FIG. 2B is a three-dimensional diagram of the dynamic true triaxial electromagnetic Hopkinson bar system additionally provided with the strain gauge sticking fixture from another angle (taking the X direction as an example)
Figure 3:
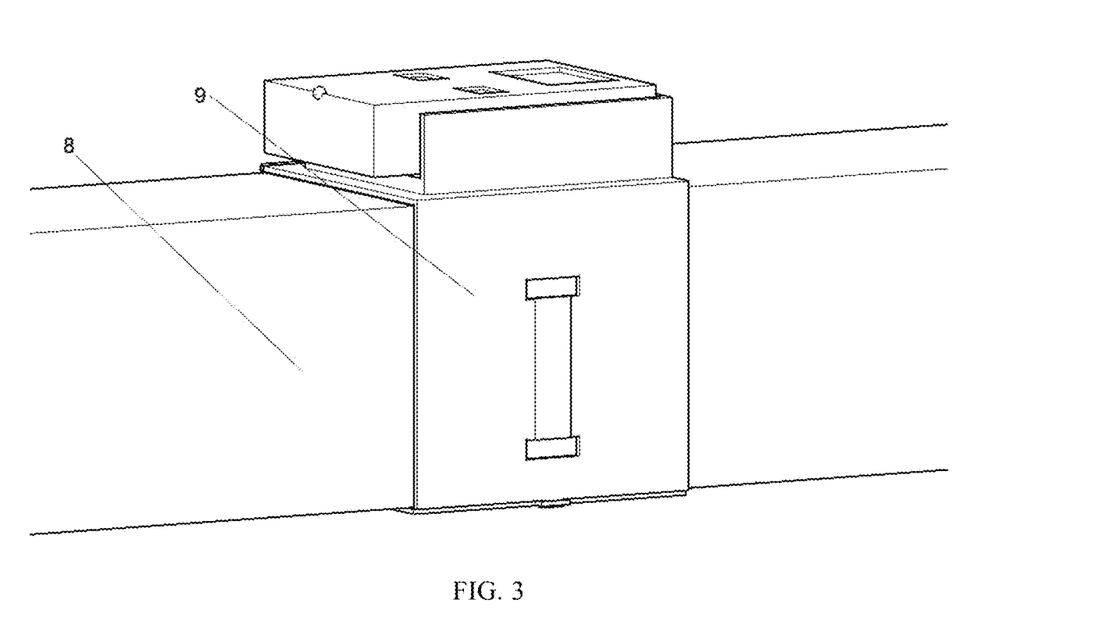
FIG. 3 is a schematic diagram of connection between the strain gauge sticking fixture and an X+ waveguide bar.
Figure 4:
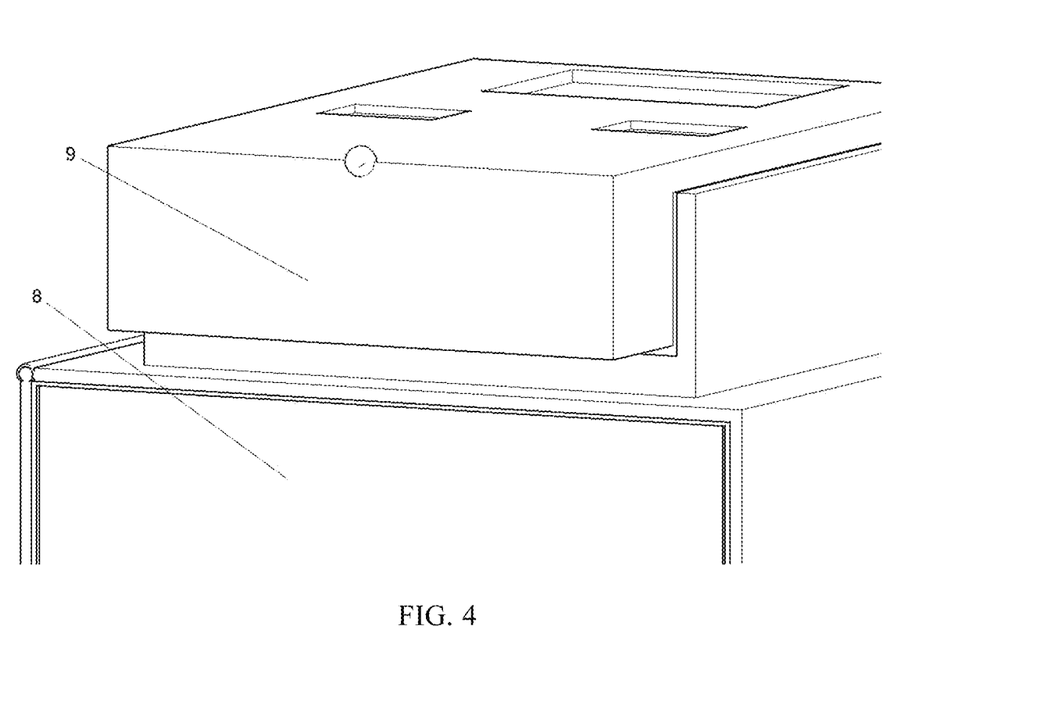
FIG. 4 is a schematic diagram of partial details of the connection between the strain gauge sticking fixture and the X+ waveguide bar.

As shown in FIG. 1, FIG. 2A and FIG. 2B, sticking strain gauges in an X+ direction is taken as an example to explain.

A test device is placed on a horizontal cross supporting platform, which comprises an X+ direction supporting platform 5, an X-direction supporting platform 15 and a central supporting platform 11. A use method is explained for testing a waveguide bar with a square cross-section size of 50 mm*50 mm (taking 50 mm*50 mm as an example is because that the waveguide bar of this size of square cross-section is commonly used at present, and it is only an example here, but not limited to this size).

Figure 5:
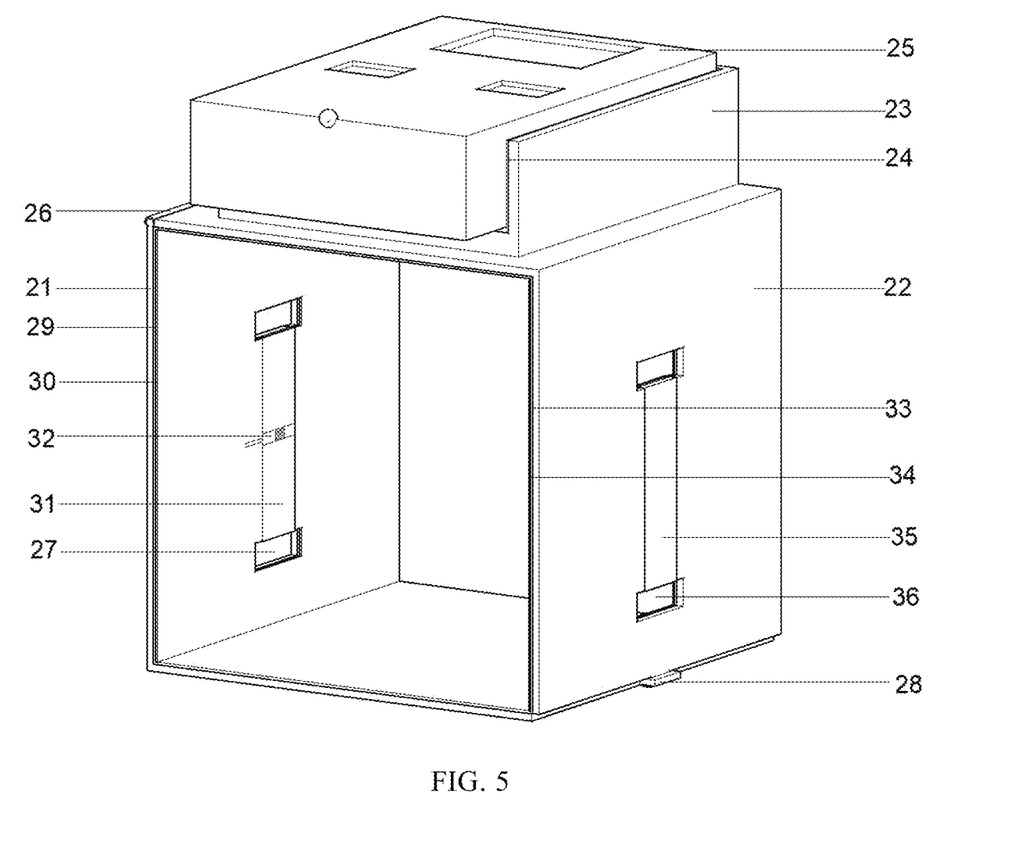
FIG. 5 is a three-dimensional diagram of the strain gauge sticking fixture.
Figure 6:
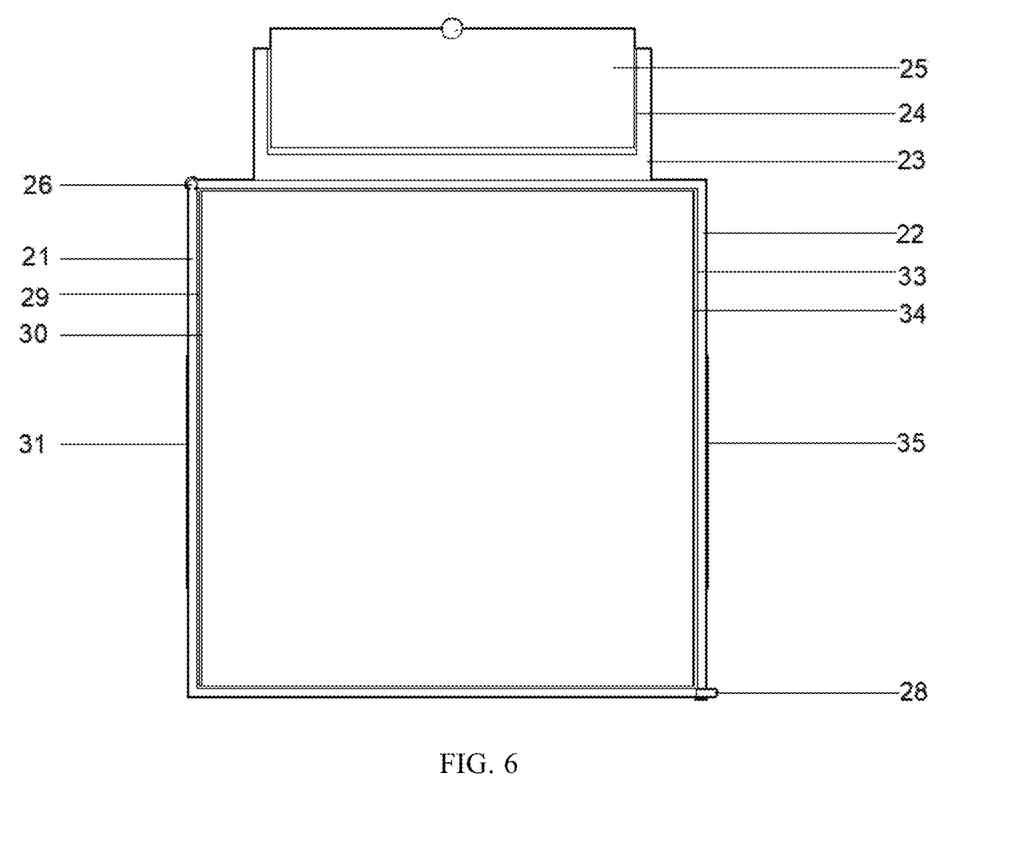
FIG. 6 is a front view of the strain gauge sticking fixture.
Figure 7:
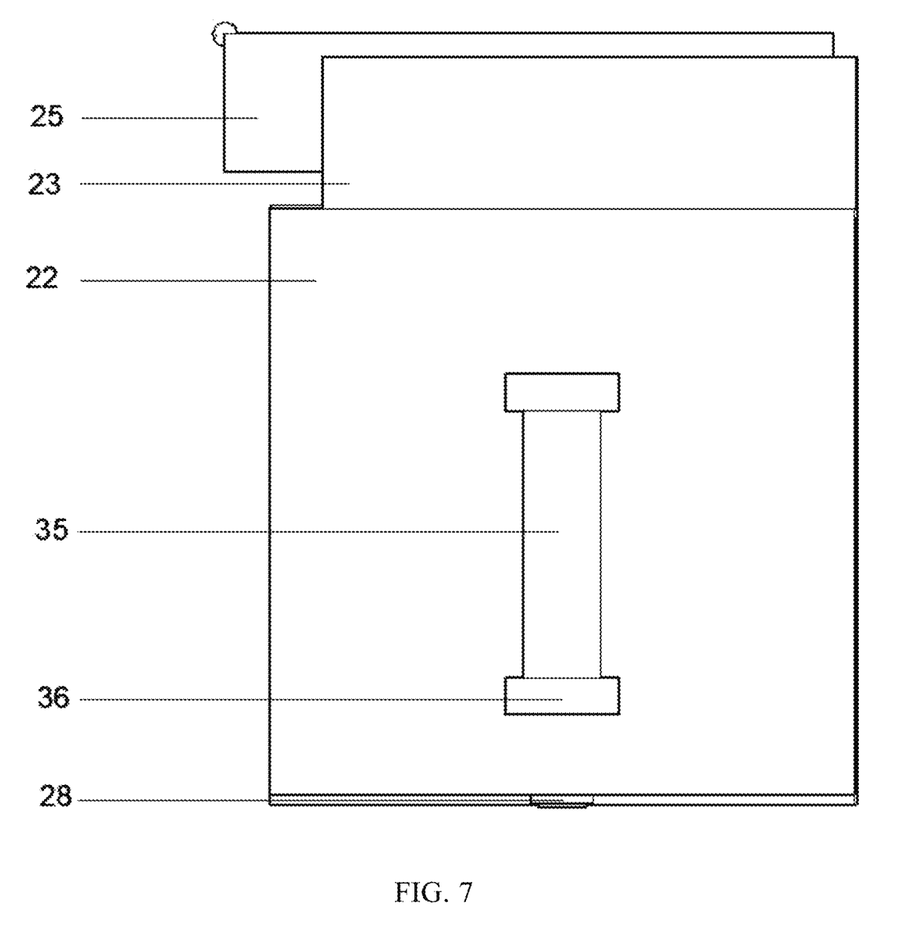
FIG. 7 is a side view of the strain gauge sticking fixture.
Figure 8:
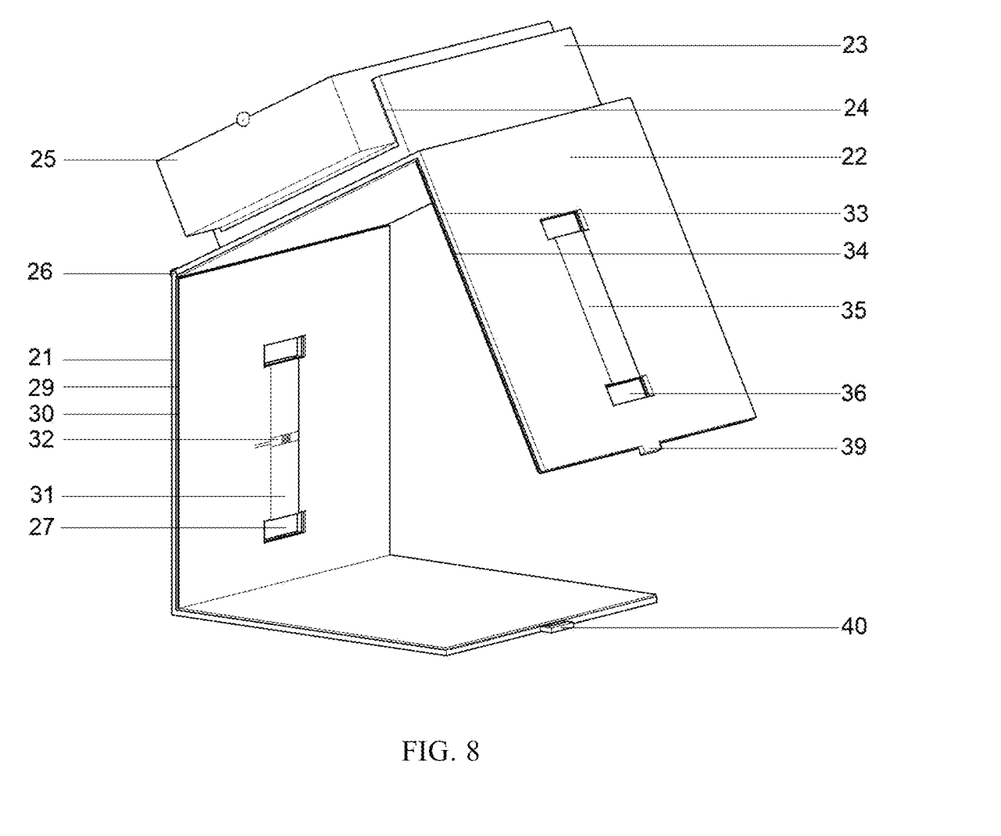
FIG. 8 is a schematic diagram of an opening of the strain gauge sticking fixture.
Figure 9A:
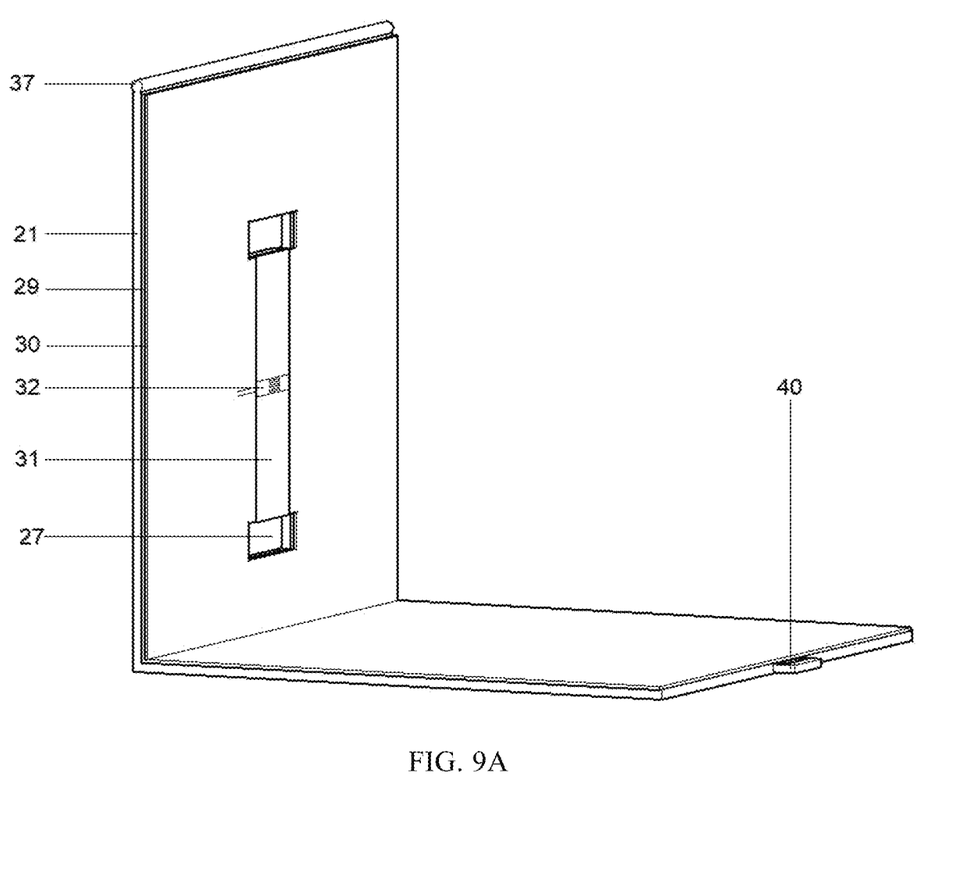
FIG. 9A is a structural diagram of a left fixture left outer frame 21 of the strain gauge sticking fixture.
Figure 9B:
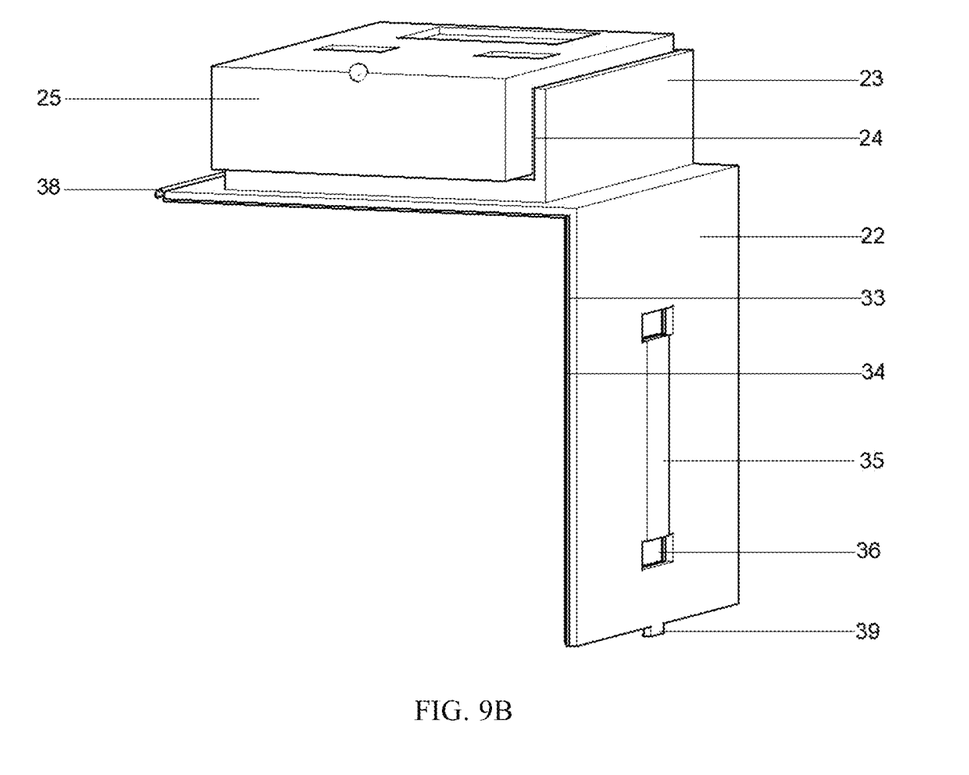
FIG. 9B is a structural diagram of a right fixture right outer frame 22 of the strain gauge sticking fixture.
Figure 10:
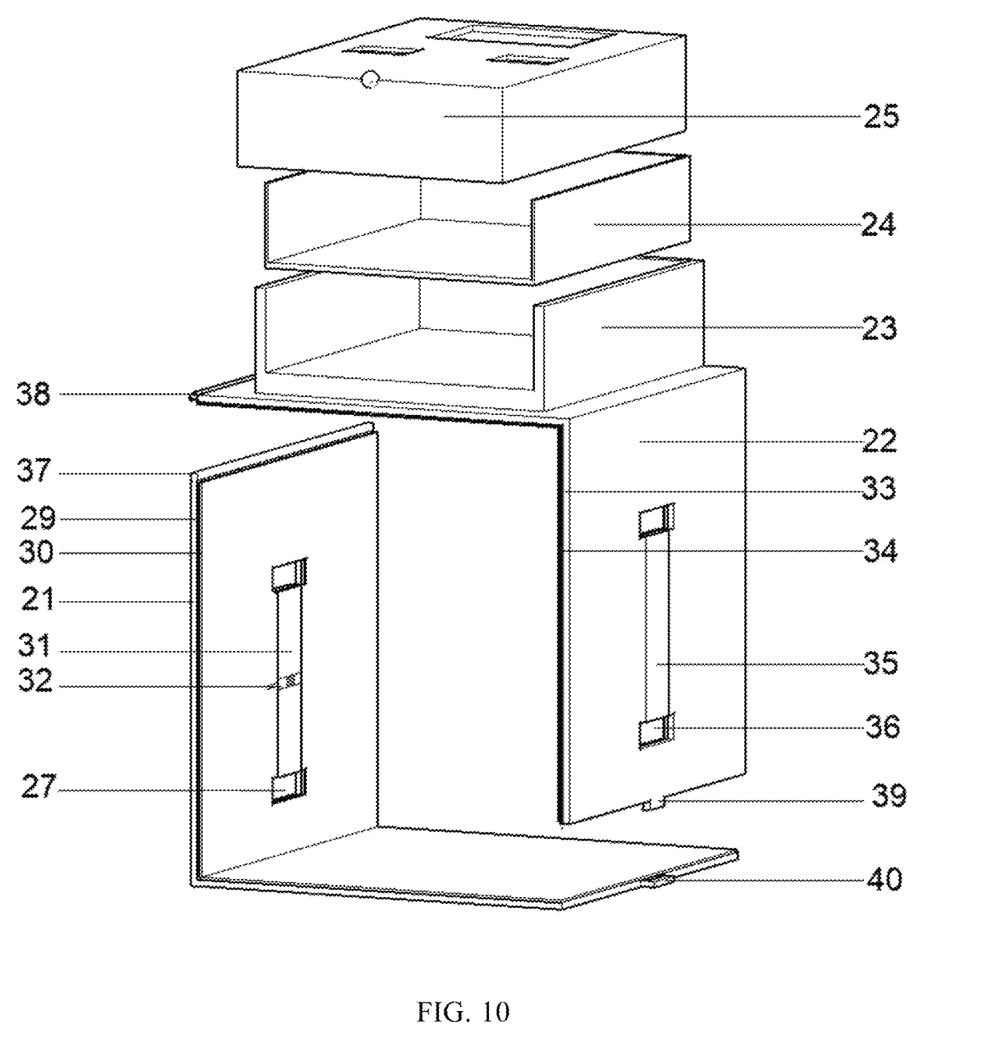
FIG. 10 is an exploded view of the strain gauge sticking fixture.

As shown in FIG. 5, before testing, a strain gauge sticking fixture 9 is assembled. The laser rangefinder 25 is installed on a laser rangefinder assembly frame 23 first, and an elastic material layer 24 (such as polyurethane) is assembled inside the laser rangefinder assembly frame 23. The elastic material layer 24 is bonded with the elastic material layer 24 by glue, etc. An inner diameter of the elastic material layer 24 is about 0.1 mm smaller than an outer diameter of the laser rangefinder 25, and stable connection between the laser rangefinder 25 and the laser rangefinder assembly frame 23 is realized by a way that the elastic material layer 24 is compressed and interference-assembled.

As shown in FIG. 5, FIG. 9A, FIG. 9B and FIG. 11, an inner side of a fixture left outer frame 21 is connected with a left elastic material cushion layer 29 (elastic material such as rubber) by glue, and an inner side of a fixture right outer frame 22 is connected with a right elastic material cushion layer 33 (elastic material such as rubber) by glue.

Figure 11:
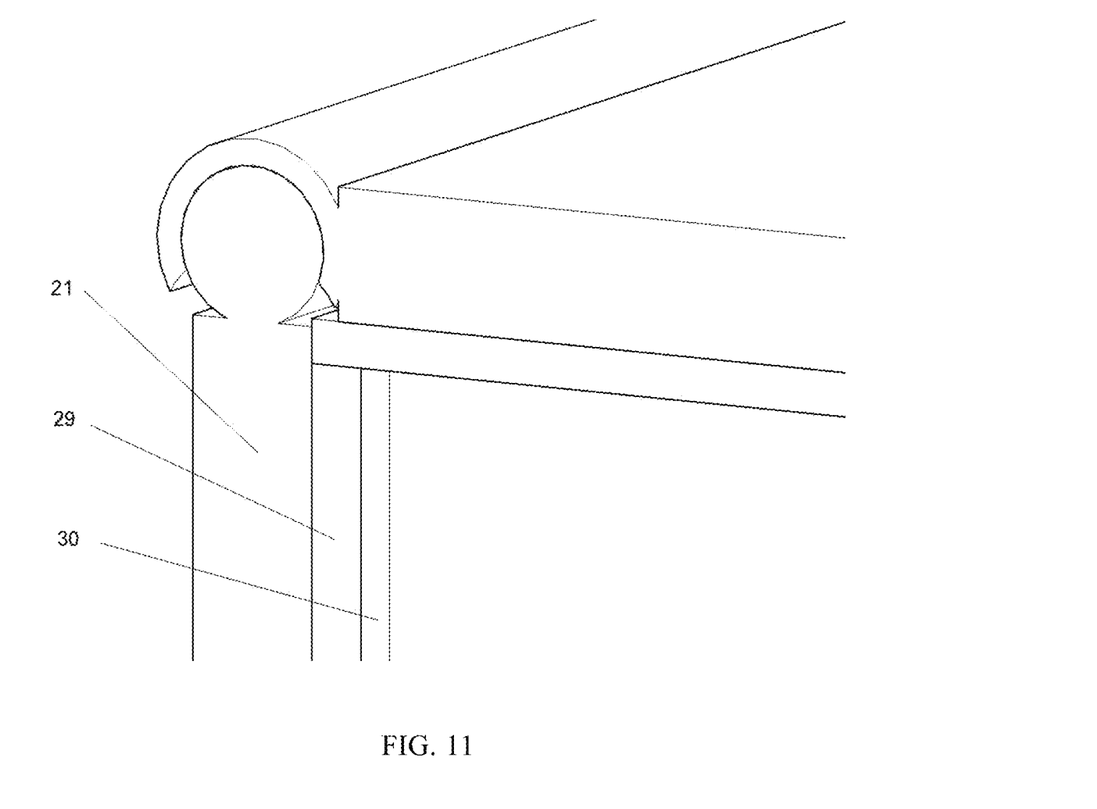
FIG. 11 is a partial detail view of the strain gauge sticking fixture.

See FIG. 5 and FIG. 11 for local details of the strain gauge sticking fixture. The left elastic material cushion layer 29 and the right elastic material cushion layer 33 are relatively thin, which are less than or equal to 0.3 mm, and it is ensured that an empty cross-section size (internal size) formed inside the left elastic material cushion layer 29 and the right elastic material cushion layer 33 is consistent with a cross-section size of the bar piece, which is 50 mm*50 mm. The elastic material cushion layer with this size is used to ensure that when the strain gauge sticking fixture 9 is assembled, the strain gauge sticking fixture 9 is in close contact with the bar piece. The elastic material cushion layer cannot only provide a pre-tightening force for the strain gauge, but also protect the strain gauge as the elastic material cushion layer has larger deformation.

As shown in FIG. 3, FIG. 4, FIG. 5 and FIG. 11, one side of a left strain gauge positioning sticker 30 contacted with the left elastic material cushion layer 29 is made of adhesive material, and the left strain gauge positioning sticker 30 is directly adhered to the left elastic material cushion layer 29 through the adhesive material layer. Similarly, one side of a right strain gauge positioning sticker 34 contacted with the right elastic material cushion layer 33 is made of adhesive material, and the right strain gauge positioning sticker 34 is directly adhered to the right elastic material cushion layer 33 through the adhesive material layer.

Figure 12:
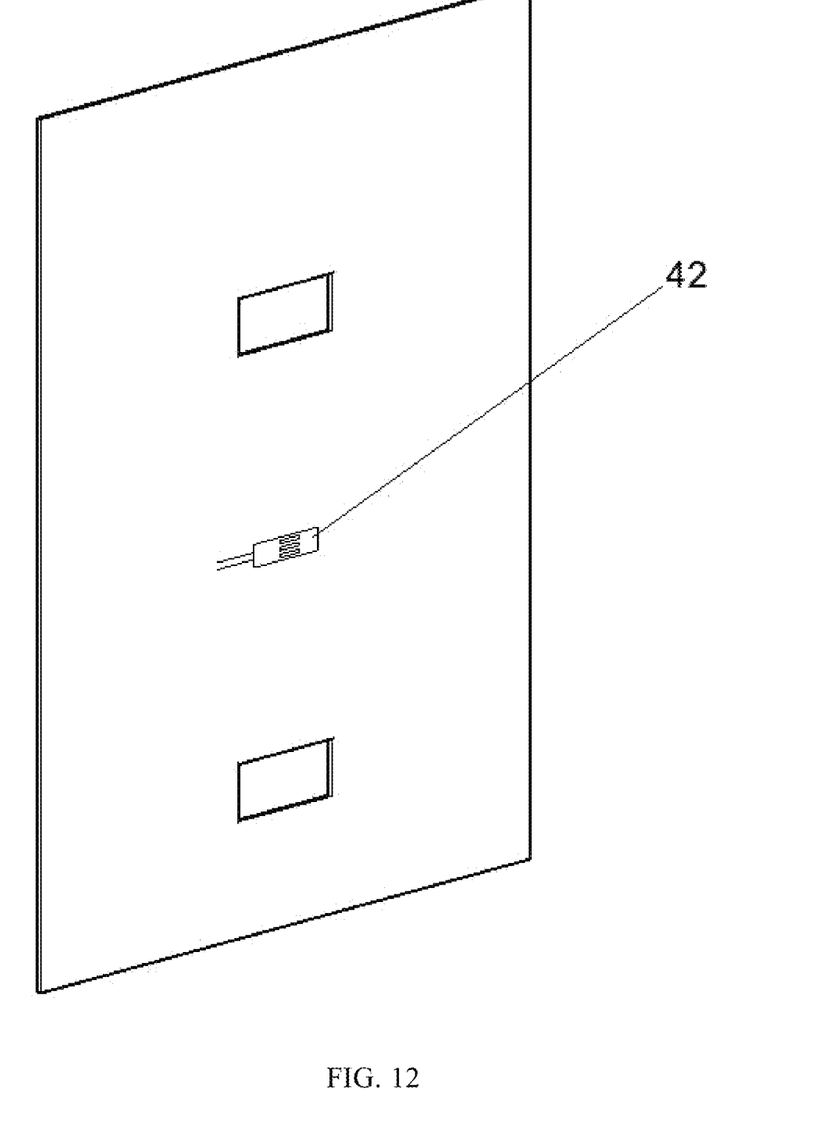
FIG. 12 is a diagram of a strain gauge positioning sticker.

As shown in FIG. 12, the strain gauge positioning sticker (middle position preferably) is depicted with a prefabricated strain gauge positioning groove 42, and a size and a shape of the prefabricated strain gauge positioning groove 42 are consistent with a strain gauge to be pasted. Using the prefabricated strain gauge positioning groove 42 can ensure that the left and right strain gauges on the same bar piece are at the same horizontal position (which may be understood as at the same height).

Embodiment 2: a use method of a fixture applied to sticking a strain gauge on a Hopkinson square bar.

As shown in FIG. 5 and FIG. 12, when sticking a strain gauge, an adhesive tape is usually used for assistance. In the strain gauge sticking fixture 9, the fixture left outer frame 21 and the fixture right outer frame 22 are respectively provided with a left adhesive tape hole 27 and a right adhesive tape hole 36 for fixing the adhesive tape. A left transparent adhesive tape for strain gauge sticking 31 and a right transparent adhesive tape for strain gauge sticking 35 are stuck firmly through the left adhesive tape hole 27 and the right adhesive tape hole 36 respectively. The side with the adhesive faces inward. When in use, the left transparent adhesive tape for strain gauge sticking and the right transparent adhesive tape for strain gauge sticking 35 are tightened to ensure that they do not shake. Through the left transparent adhesive tape for strain gauge sticking 31 and the right transparent adhesive tape for strain gauge sticking 35, positions where the strain gauges need to be stuck on the left strain gauge positioning sticker 30 and the right strain gauge positioning sticker 34 can be observed according to the prefabricated strain gauge positioning groove 42. Corresponding to the shapes of the prefabricated strain gauges on the left strain gauge positioning sticker 30 and the right strain gauge positioning sticker 34, the left and right strain gauges 32 are pressed onto the left transparent adhesive tape for strain gauge sticking 31 and the right transparent adhesive tape for strain gauge sticking 35 respectively. The strain gauges may be pressed by toothpicks, etc., so that the strain gauges can be firmly attached to the adhesive tapes.

As shown in FIG. 5, FIG. 8, FIG. 9A, FIG. 9B and FIG. 10, the fixture left outer frame 21 and the fixture right outer frame 22 are connected through a left fixture outer frame rotating shaft 37 (the left fixture outer frame rotating shaft 37 belongs to the rotating shaft structure 26) and a right fixture outer frame snap ring 38. The strain gauge sticking fixture 9 can be opened by opening a clamping buckle 28 (the clamping buckle 28 is composed of a right fixture outer frame clamping buckle 39 and a left fixture outer frame clamping buckle 40) and rotating the rotating shaft structure 26. See FIG. 8 for the opening diagram of the strain gauge sticking fixture 9. In an open state of the strain gauge sticking fixture 9, the strain gauge sticking fixture 9 is clamped on a waveguide bar. For example, when the strain gauge sticking fixture is clamped on an X+ direction waveguide bar 8, an upper edge of an inner side of the strain gauge sticking fixture 9 is kept to be not clamped with the clamping buckle 28, and the strain gauge sticking fixture is kept in the open state, the laser rangefinder 25 is turned on to measure a distance by taking an X+ direction waveguide bar supporting holder 7 closest to the strain gauge sticking fixture 9 as a reference object, and the strain gauge sticking fixture 9 is moved along an X-axis direction until the laser rangefinder 25 displays a specified value. An upper side of the strain gauge sticking fixture 9 is pressed, the fixture left outer frame 21 is opened first, and a slender stick is used to evenly coat glue on the left strain gauge, then a lower side of the strain gauge sticking fixture 9 is pressed, the fixture right outer frame 22 is opened, and a slender stick is used to evenly coat glue on the right strain gauge. After the strain gauges on the two sides are coated with glue, the clamping buckle 28 is closed.

Because the empty cross-section formed by the left elastic material cushion layer 29 and the right elastic material cushion layer 33 in the strain gauge sticking fixture 9 is consistent with a cross-section size of the X+ direction waveguide bar 8, they are tightly contacted. A pre-tightening force is applied to the strain gauge to squeeze out bubbles at a contact position between the strain gauge and the bar piece, so as to accelerate curing of the strain gauge and the bar piece. Meanwhile, because the transparent adhesive tape is attached to the outer side of the strain gauge (one side far from the waveguide bar), the glue overflowing from the strain gauge can be effectively prevented from adhering the bar piece and the strain gauge sticking fixture 9.

After sticking, the adhesive tape is removed from an outer side of the adhesive tape hole first after the strain gauge is cured for 10 minutes, the clamping buckle 28 is opened to remove the strain gauge sticking fixture 9, and then the adhesive tape is uncovered slowly to complete sticking the strain gauge on one bar piece. The removing means to untie the adhesive tape from the outside, and the uncovering means to uncover the adhesive tape from the strain gauge after removing the fixture. Sticking steps of the strain gauges on other bar pieces are the same, and reference objects with axial position parameters along the bar pieces are selected, and the strain gauge sticking fixture 9 is moved to a proper position through the laser rangefinder to ensure that the strain gauges on each bar piece is stuck to the same axial position.

The use of the fixture ensures position consistency of the strain gauges, not only ensures consistency of horizontal positions of a pair of strain gauges on the same waveguide bar, but also ensures the consistency of the axial positions of strain gauges on multiple bar pieces, and reduces data deviation caused by position errors of the strain gauges.

The foregoing are further detailed descriptions of the present invention with reference to the specific preferred embodiments, and it should not be considered that the embodiments of the present invention are limited to these descriptions. For those having ordinary skills in the art, some simple deduction or replacement can be made without departing from the concept of the present invention, which shall all be included within the scope of protection of the present invention.

What is claimed is:

1. A fixture applied to sticking a strain gauge on a Hopkinson square bar, comprising a laser rangefinder assembly frame (23), an elastic material layer (24), a laser rangefinder (25), a fixture outer frame, an elastic material cushion layer, a strain gauge positioning sticker, a transparent adhesive tape for strain gauge sticking, adhesive tape holes, a clamping buckle (28) and a rotating shaft structure (26), wherein:

the rotating shaft structure (26) is arranged on the fixture outer frame; the elastic material layer (24) is arranged in the laser rangefinder assembly frame (23), and stable connection between the laser rangefinder (25) and the laser rangefinder assembly frame (23) is realized by a way that the elastic material layer (24) is compressed and interference-assembled; the elastic material cushion layer is arranged in the fixture outer frame; at least one strain gauge positioning sticker is provided, one side of the strain gauge positioning sticker contacted with the elastic material cushion layer is made of adhesive material, and the strain gauge positioning sticker is directly adhered to the elastic material cushion layer through the adhesive material layer; the strain gauge positioning sticker is depicted with a prefabricated strain gauge positioning groove (42), and a size and a shape of the prefabricated strain gauge positioning groove (42) are consistent with a strain gauge to be pasted; and a number of the adhesive tape holes corresponds to the strain gauge positioning sticker, one strain gauge positioning sticker corresponds to two adhesive tape holes, the adhesive tape holes are used for fixing the transparent adhesive tape for strain gauge sticking, and the transparent adhesive tape for strain gauge sticking is tightly stuck on the strain gauge positioning sticker through the adhesive tape holes.

2. The fixture applied to sticking the strain gauge on the Hopkinson square bar according to claim 1, wherein the laser rangefinder assembly frame (23) and the elastic material layer (24) are bonded by glue.

3. The fixture applied to sticking the strain gauge on the Hopkinson square bar according to claim 1, wherein an inner diameter of the elastic material layer (24) is about 0.1 mm smaller than an outer diameter of the laser rangefinder (25).

4. The fixture applied to sticking the strain gauge on the Hopkinson square bar according to claim 1, wherein a thickness of the elastic material cushion layer is less than or equal to 0.3 mm.

5. The fixture applied to sticking the strain gauge on the Hopkinson square bar according to claim 1, wherein a size inside the elastic material cushion layer is consistent with a cross-section size of a bar piece.

6. The fixture applied to sticking the strain gauge on the Hopkinson square bar according to claim 1, wherein the fixture outer frame comprises a fixture left outer frame (21) and a fixture right outer frame (22), and the fixture left outer frame (21) and the fixture right outer frame (22) are connected through a left fixture outer frame rotating shaft (37) and a right fixture outer frame snap ring (38).

7. The fixture applied to sticking the strain gauge on the Hopkinson square bar according to claim 6, wherein the elastic material cushion layer comprises a left elastic material cushion layer (29) and a right elastic material cushion layer (33); and an inner side of the fixture left outer frame (21) is connected with the left elastic material cushion layer (29), and an inner side of the fixture right outer frame (22) is connected with the right elastic material cushion layer (33).

8. A use method of a fixture applied to sticking a strain gauge on a Hopkinson square bar, wherein the method utilizes the fixture applied to sticking the strain gauge on the Hopkinson square bar according to claim 1 to perform the following operations:

opening the clamping buckle (28), which is composed of a right fixture outer frame clamping buckle (39) and a left fixture outer frame clamping buckle (40), and connecting left and right outer frame parts by using the rotating shaft structure (26), and rotating the rotating shaft structure (26) to open the strain gauge sticking fixture (9);

in an open state of the strain gauge sticking fixture (9), clamping the strain gauge sticking fixture on a waveguide bar, for an X+ direction waveguide bar (8), keeping an upper edge of an inner side of the strain gauge sticking fixture (9) without being clamped with the clamping buckle (28), keeping the strain gauge sticking fixture (9) in the open state, turning on the laser rangefinder (25) to measure a distance by taking an X+ direction waveguide bar supporting holder (7) closest to the strain gauge sticking fixture (9) as a reference object, and moving the strain gauge sticking fixture (9) along an X-axis direction until the laser rangefinder (25) displays a specified value;

pressing an upper side of the strain gauge sticking fixture (9) and opening an outer frame of the strain gauge sticking fixture (9); and fixing a strain gauge (32) on the transparent adhesive tape for strain gauge sticking; a fixed position of the strain gauge (32) being based on the prefabricated strain gauge positioning groove (42);

coating glue evenly on the strain gauges, and after all the strain gauges are coated with glue, closing the clamping buckle (28);

applying a pre-tightening force to the strain gauge to squeeze out bubbles at a contact position between the strain gauge and the bar piece, so as to accelerate curing of the strain gauge and the bar piece; and after sticking, removing the adhesive tape from an outer side of the adhesive tape hole first after the strain gauge is cured, opening the clamping buckle (28) to remove the strain gauge sticking fixture (9), and then slowly uncovering the adhesive tape to complete sticking the strain gauge on one bar piece;

wherein, sticking steps of the strain gauges on other bar pieces are the same, and reference objects with axial position parameters along the bar pieces are selected, wherein the axial position parameters along the bar pieces are that before the strain gauge is stuck, an axial position of the strain gauge relative to the bar piece is measured through the laser rangefinder, and the strain gauge sticking fixture (9) is moved to a proper position through the laser rangefinder to ensure that the strain gauges on each bar piece is stuck to the same axial position.

9. The fixture applied to sticking the strain gauge on the Hopkinson square bar according to claim 8, wherein when the laser rangefinder (25) is not installed, the laser rangefinder (25) is first installed on the laser rangefinder assembly frame (23).

\* \* \* \* \*